US010827171B2

(12) United States Patent
Li et al.

(10) Patent No.: US 10,827,171 B2
(45) Date of Patent: Nov. 3, 2020

(54) METHOD AND APPARATUS FOR VIDEO CODING

(71) Applicant: Tencent America LLC, Palo Alto, CA (US)

(72) Inventors: Xiang Li, Saratoga, CA (US); Xin Zhao, San Diego, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/678,423

(22) Filed: Nov. 8, 2019

(65) Prior Publication Data

US 2020/0154101 A1 May 14, 2020

Related U.S. Application Data

(60) Provisional application No. 62/784,350, filed on Dec. 21, 2018, provisional application No. 62/767,201, filed on Nov. 14, 2018.

(51) Int. Cl.
*H04N 19/105* (2014.01)
*H04N 19/46* (2014.01)
*H04N 19/176* (2014.01)
*H04N 19/137* (2014.01)
*H04N 19/132* (2014.01)

(52) U.S. Cl.
CPC ......... *H04N 19/105* (2014.11); *H04N 19/132* (2014.11); *H04N 19/137* (2014.11); *H04N 19/176* (2014.11); *H04N 19/46* (2014.11)

(58) Field of Classification Search
CPC .. H04N 19/105; H04N 19/132; H04N 19/137; H04N 19/176; H04N 19/46
See application file for complete search history.

(56) References Cited

U.S. PATENT DOCUMENTS

| 2013/0272411 | A1* | 10/2013 | Tu ........................ H04N 19/51 |
| | | | 375/240.16 |
| 2015/0222904 | A1* | 8/2015 | Zhou ................... H04N 19/124 |
| | | | 375/240.03 |
| 2016/0277749 | A1* | 9/2016 | Lim ...................... H04N 19/56 |
| 2016/0330444 | A1* | 11/2016 | Lim .................... H04N 19/139 |
| 2016/0337660 | A1* | 11/2016 | Sugio .................. H04N 19/503 |

* cited by examiner

*Primary Examiner* — Farzana Hossain
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. In some embodiments, the processing circuitry decodes prediction information of a current block from a coded video bitstream, and the prediction information includes merge flags that respectively indicate usage/non-usage of corresponding merge modes. Further, the processing circuitry decodes the merge flags in an order of usage frequencies of the corresponding merge modes to find a first flag that indicates a usage of the corresponding merge mode of the first flag on the current block. Then, the processing circuitry reconstructs samples of the current block according to the corresponding merge mode of the first flag.

20 Claims, 15 Drawing Sheets

METHOD AND APPARATUS FOR VIDEO CODING

INCORPORATION BY REFERENCE

This present application claims the benefit of priority to U.S. Provisional Application No. 62/767,201, "EFFICIENT MERGE FLAG SIGNALING METHODS" filed on Nov. 14, 2018, and U.S. Provisional Application No. 62/784,350, "SIGNALING OF SUB-BLOCK MERGE LIST SIZE" filed on Dec. 21, 2018. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

SUMMARY

Aspects of the disclosure provide methods and apparatuses for video encoding/decoding. In some examples, an apparatus for video decoding includes receiving circuitry and processing circuitry. In some embodiments, the processing circuitry decodes prediction information of a current block from a coded video bitstream, and the prediction information includes merge flags that respectively indicate usage/non-usage of corresponding merge modes. Further, the processing circuitry decodes the merge flags in an order of usage frequencies of the corresponding merge modes to find a first flag that indicates a usage of the corresponding merge mode of the first flag on the current block. Then, the processing circuitry reconstructs samples of the current block according to the corresponding merge mode of the first flag.

In some embodiments, the merge flags include at least one of a flag corresponding to a merge with motion vector difference mode, a flag corresponding to a sub-block merge prediction mode, a flag corresponding to a multi-hypothesis prediction for intra mode and a flag corresponding to a triangular prediction unit mode.

In an embodiment, the processing circuitry decodes the merge flags in a usage frequency reducing order of the corresponding merge modes.

In some embodiments, the processing circuitry decodes a coding order signal from the coded video bitstream. The coding order signal is indicative of the order for decoding the merge flags. Then, the processing circuitry decodes the merge flags according to the order that is indicated by the coding order signal. In some examples, the processing circuitry decodes the coding order signal from at least one of a sequence parameter set (SPS), a picture parameter set (PPS), a slice header, a tile group header, and a tile header.

In some embodiments, when at least one of a width and a height is smaller than a threshold, the processing circuitry sets a flag corresponding to a triangular prediction unit mode to a default value that disables a usage of the triangular prediction unit mode.

In some embodiments, the processing circuitry decodes a mode index from the coded video bitstream, and then selects a merge mode from one of a merge with motion vector difference mode, a sub-block merge prediction mode, a multi-hypothesis prediction for intra mode and a triangular prediction unit mode based on the mode index.

In some embodiments, the processing circuitry decodes a flag corresponding to a sub-block merge prediction mode using a first set of context models that is different from a second set of context models that is used for deriving a flag for an affine inter prediction mode.

In some examples, the processing circuitry decodes a size signal that is indicative of a size of a merge candidate list, and then determines a size of a sub-block based merge candidate list based on the size signal. In an example, when one of an affine mode and a sub-block based temporal motion vector prediction (SbTMV) is disabled, the processing circuitry reduces the size of the sub-block based merge candidate list without changing the size of the merge candidate list.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
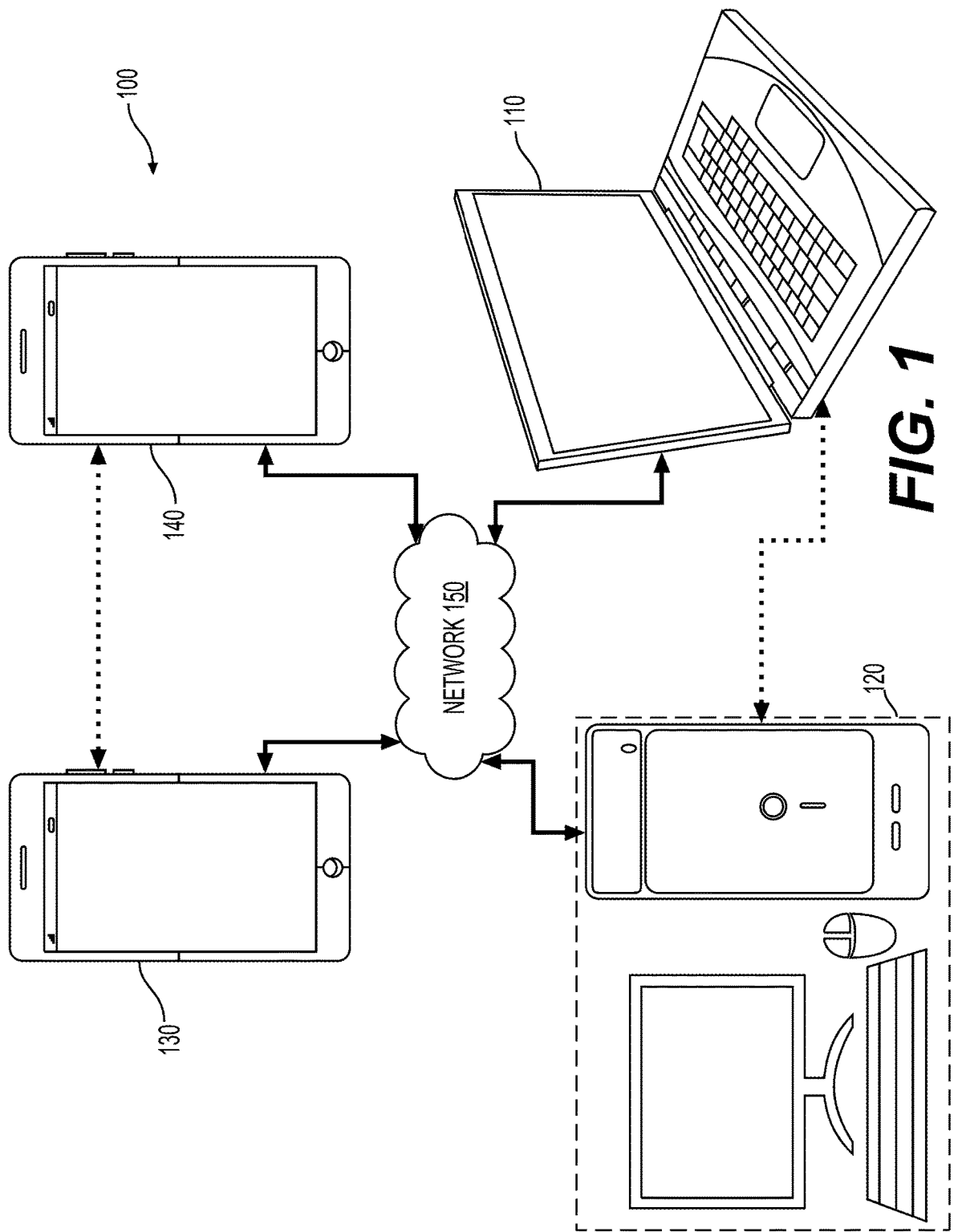
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
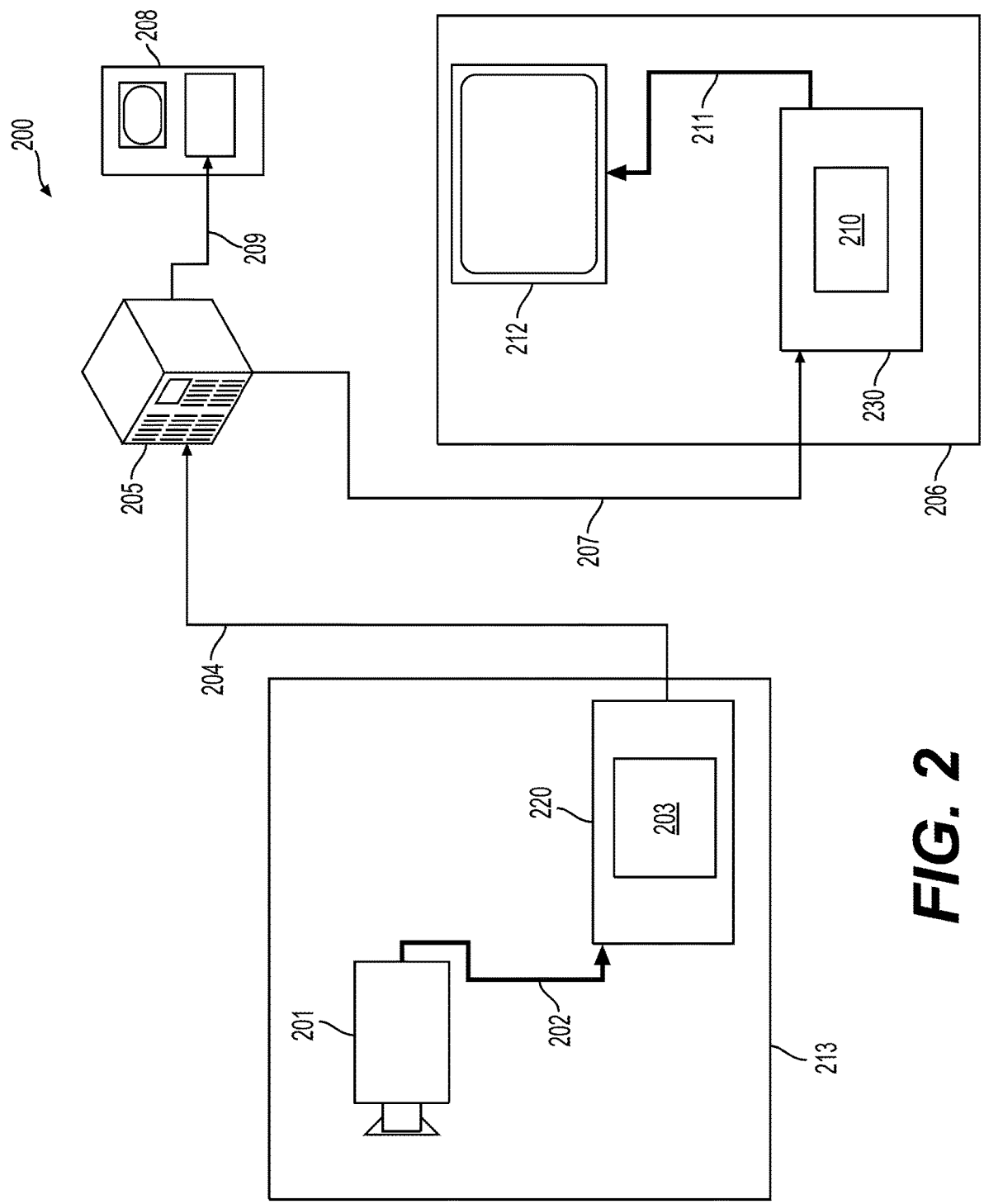
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
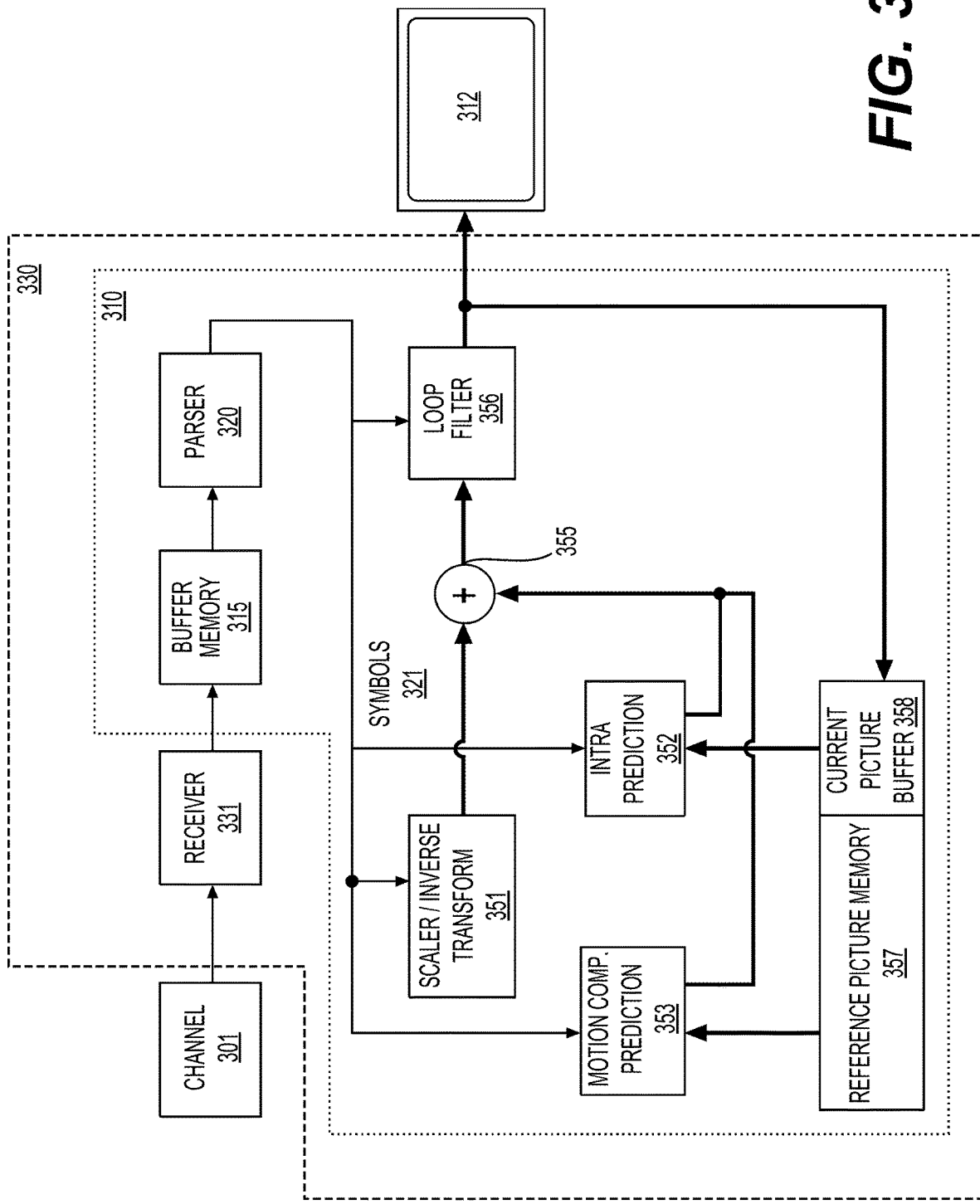
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
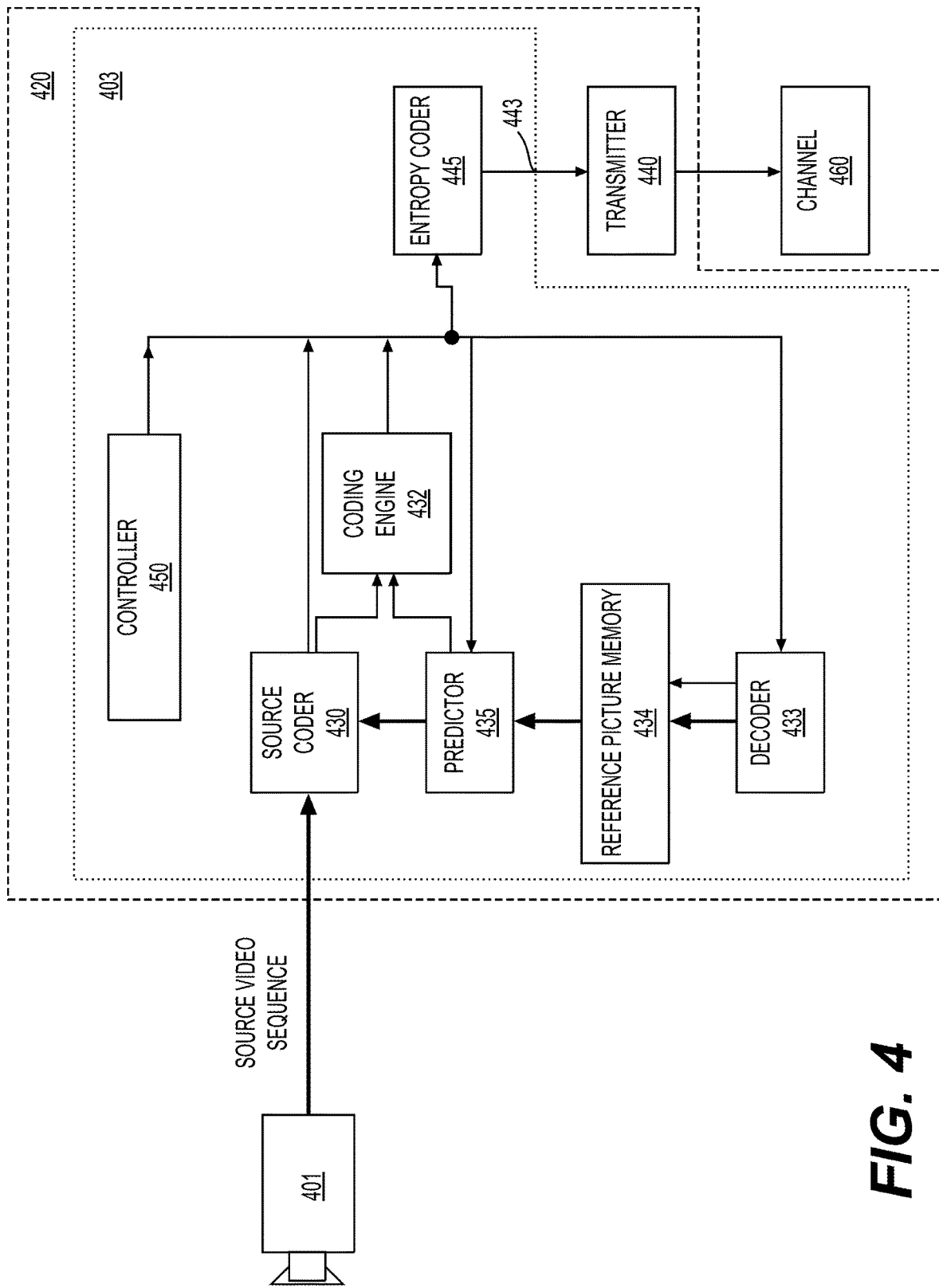
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
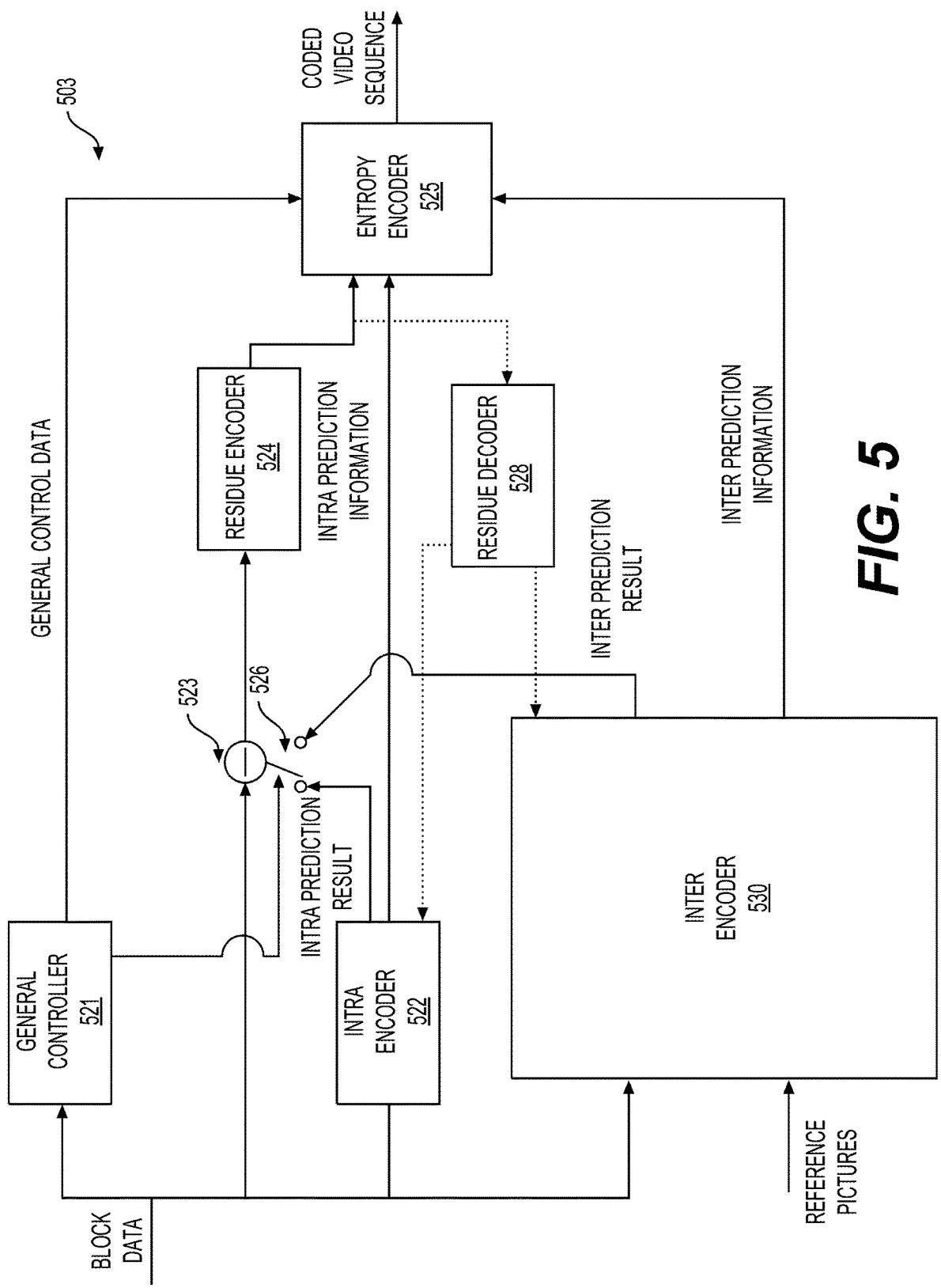
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
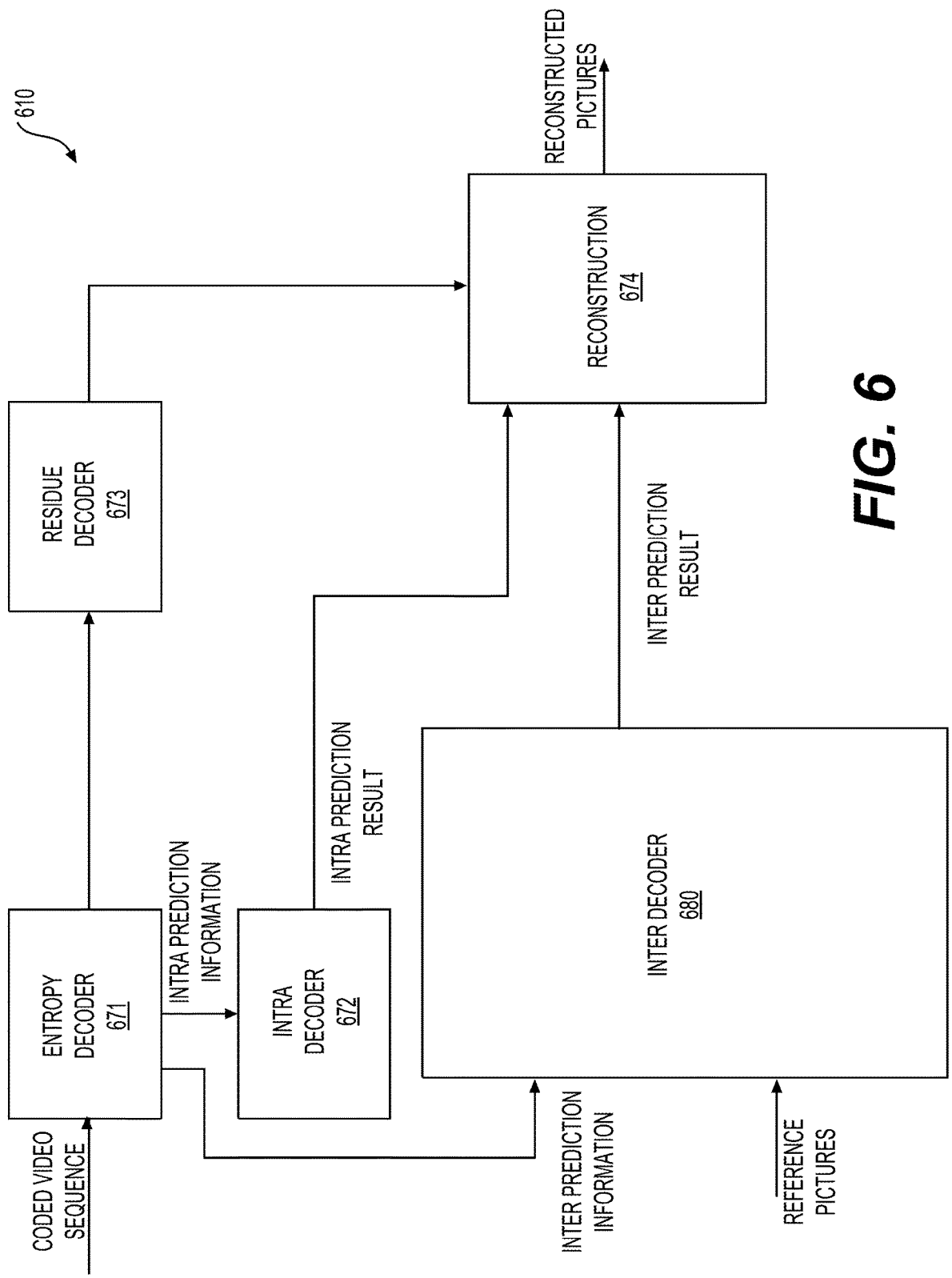
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide efficient signaling techniques, such as efficient merge flag signaling techniques and signaling techniques for the size of candidate lists.

According to some aspects of the disclosure, the efficient signaling of merge mode related flags is used in hybrid video coding technologies to improve the coding performance of merge mode. According to some other aspects of the disclosure, the size of a merge list for sub-block based candidate list is unified with regular inter merge candidate list.

Various tools, such as merge mode with MV difference (MMVD), sub-block merge prediction mode, multi-hypothesis prediction for intra mode, triangle prediction unit mode (or triangle prediction mode), affine merge prediction, and the like can be used with merge mode.

MMVD is also referred to as ultimate motion vector expression (UMVE) that provides a new motion vector expression with simplified signaling, where the motion vector is represented by a starting point, motion magnitude, and motion direction. The starting point is indicated by syntax element base_mv_idx, which specifies the base candidate index of the merge candidate list. The motion magnitude is indicated by syntax element distance_idx, which specifies the distance offset from an UMVE base MV. The motion direction represents the direction of the motion vector difference (MVD) relative to the starting point, which is indicated by syntax element direction_idx.

In some embodiments, to indicate whether the current coding unit is used UMVE to generate the prediction MV, one flag named umve_flag is firstly signaled. When umve_flag is not present in coded video bitstream, umve_flag is inferred to be equal to 0. In an example, when the umve_flag is one, UMVE mode is used.

For example, (x0, y0) specifies the location of the top-left luma sample of the current coding block relative to the top-left luma sample of the picture. When umve_flag[x0][y0] is equal to 1 for the current coding unit, ultimate motion vector expression is used to generate the prediction MV of the current coding unit. When umve_flag[x0][y0] is equal to 1, the syntax elements base_mv_idx[x0][y0], distance_idx[x0][y0] and direction_idx[x0][y0] are parsed after umve_flag[x0][y0] from the coded video bitstream in an example.

In sub-block merge prediction mode, the motion information of each sub-block inside a coding block is predicted. According to an aspect of the disclosure, multiple sub-block merge prediction methods, such as affine merge and advanced temporal motion vector prediction (ATMVP) can be used. In the affine merge prediction in an example, affine motion compensation described by a 6-parameter (or a simplified 4-parameter) model is used to calculate the motion vector of each sub-block inside a coding block.

In the ATMVP in an example, the motion vectors of sub-CUs within a CU are predicted through the following two steps. The first step is to identify the corresponding block in a reference picture with a so-called temporal vector. The reference picture is called the motion source picture in an example. The second step is to split the current CU into sub-CUs and obtain the motion vectors as well as the reference indices of each sub-CU in the corresponding block that corresponds to each sub-CU in the current CU.

In some embodiments, to indicate whether the current coding unit uses sub-block merge prediction to generate the prediction MV, one flag named sub_block_flag is firstly signaled. In an example, when sub_block_flag is 1, the sub-block merge prediction is used.

In an embodiment, since the sub-block merge candidate list consists of the affine merge candidates and ATMVP, the syntax element merge_idx is further signaled to indicate which candidate within the sub-block merge candidate list is used when sub_block_flag is equal to 1. In an example, (x0, y0) specifies the location of the top-left luma sample of the considered coding block relative to the top-left luma sample of the picture. When sub_block_flag[x0][y0] is equal to 1 for the current coding unit, sub-block merge prediction is used to generate the prediction MV of the current coding unit. When sub_block_flag[x0][y0] is equal to 1, the syntax element merge_idx[x0][y0] is parsed after sub_block_flag[x0][y0].

In multi-hypothesis prediction for intra mode (MHIntra mode), the intra prediction and merge index prediction are combined to get the final prediction. In some embodiments, for Luma component, the intra candidate list can include 4 intra prediction modes and one intra prediction mode is selected from the intra candidate list based on an intra mode index to get the intra prediction. For chroma component, direct mode is applied without extra signaling in an example.

In some examples, to indicate whether the current coding unit uses MHIntra mode to generate the prediction, one flag named MHIntra_flag is signaled. To further indicate which intra mode is used when MHIntra_flag is equal to 1, the syntax element MHIntra_mode_idx is signaled. In an example, (x0, y0) specifies the location of the top-left luma sample of the considered coding block relative to the top-left luma sample of the picture. When MHIntra_flag[x0][y0] is equal to 1 for the current coding unit, MHIntra mode is used to generate the final prediction. When MHIntra_flag[x0][y0] is equal to 1, the syntax element MHIntra_mode_idx[x0][y0] is parsed after MHIntra_flag[x0][y0].

In triangle prediction unit mode, a CU is split into two triangular prediction units, in either diagonal or inverse diagonal direction. Each triangular prediction unit in the CU is inter-predicted using its own uni-prediction motion vector and reference frame index. After predicting each of the triangular prediction units, an adaptive weighting process is applied to the diagonal edge between the two triangular prediction units to derive the final prediction.

Figure 7:
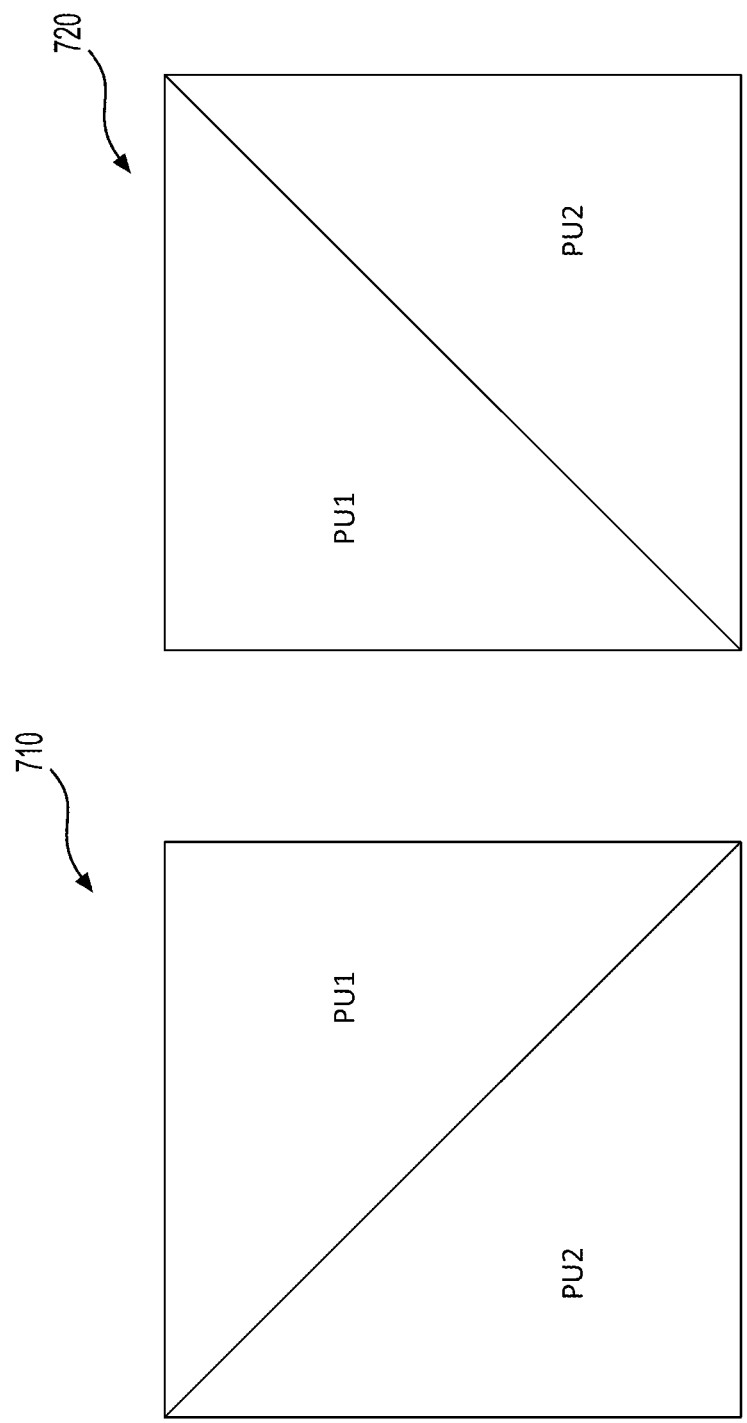
FIG. 7 shows examples of triangular prediction.

FIG. 7 shows two CU examples (710) and (720) of triangular prediction. The CU (710) is split from top-left corner to bottom-right corner (referred to as diagonal direction) into two triangular prediction units, and the CU (720) is split from top-right corner to bottom-left corner (referred to as inverse diagonal direction) into two triangular prediction units PU1 and PU2. Each triangular prediction unit in the CU is inter-predicted using its own uni-prediction motion vector and reference frame index which are derived from a uni-prediction candidate list. Further, an adaptive weighting process is performed to the diagonal edge after predicting the triangular prediction units. Then, the transform and quantization process are applied to the whole CU.

In some embodiments, to indicate whether the current coding unit uses triangle mode, one flag named triangle_flag is signaled. In some example, since the triangle merge candidate list is constructed in triangle mode, the syntax element triangle_merge_idx is signaled to indicate the splitting method and the indexes of the candidates used by the two triangular prediction units. In an example, (x0, y0) specifies the location of the top-left luma sample of the currant coding block relative to the top-left luma sample of the picture. Thus, when triangle_flag[x0][y0] equals to 1 for the current coding unit, triangle mode is used. When triangle_flag[x0][y0] equals to 1, the syntax element triangle_merge_idx is parsed after triangle_flag[x0][y0].

In some embodiments, such as in a version of VVC, some coding tools, such as the ultimate motion vector expression, the sub-block merge prediction, the multi-hypothesis prediction for intra mode, the triangle prediction unit mode and the like, are used in merge/skip mode to improve the coding performance. In some examples, these coding tools are conditionally used for a coding block. In an example, width and height are the width and height of coding block, respectively. Then, the sub-block merge prediction is used for the coding block only when width>=8 and height>=8; the multi-hypothesis prediction for intra mode is used for the coding block when width×height>=64 and width<128 and height<128; the triangular prediction unit mode is used when width×height>=64.

Further, to indicate which coding tool is used at the decoder, flags, such as umve_flag, sub_block_flag, MHIntra_flag and triangle_flag are signaled. When one flag is equal to false (e.g., binary zero), the corresponding coding tool will not be used.

In some examples, the flags are coded in an order of umve_flag, sub_block_flag, MHIntra_flag and triangle_flag. Table 1 lists the syntax elements and their coding condition.

TABLE 1

The Coding Condition of Merge Related Syntax Elements.

| Syntax elements | Signaling Condition |
| --- | --- |
| umve_flag | |
| sub_block_flag | umve_flag == false && width >= 8 && height >= 8 |
| MHIntra_flag | umve_flag == false && sub_block_flag == false && width×height >= 64 && width < 128 && height < 128 |
| triangle_flag | affine == false && width×height >= 64 |

For example, the following signaling process can be used: umve_flag is firstly signaled; if umve_flag is equal to false, meanwhile width>=8 and height>=8, then sub_block_flag is signaled; if umve_flag and sub_block_flag are both equal to false, meanwhile width×height>=64 and width<128 and height<128, MHIntra_flag is signaled; if the block is not affine mode, meanwhile width×height>=64, triangle_flag is signaled.

In some embodiments, to efficiently compress triangle_flag, three context models are used, and one context model is selected from the three context models. In some examples, a context model is a probability model that can be chosen based on statistics of recently coded information (e.g., neighboring coding information). For example, the selection of the context models depends on the value of triangle_flag from the neighboring left and above coding blocks in an example. More specifically, when the triangle_flags of left and above coding blocks are both equal to false, the context model with index 0 is used for the current coding block; if the triangle_flags of left and above coding blocks are both equal to true, the context model with index 2 is used for the current coding block; otherwise, the context model with index 1 is used for the current coding block.

It is noted that affine inter prediction can be enabled. In VCC, for example, in the affine inter prediction, the motion information for three or two control points are signaled and a 6-parameter (or a simplified 4-parameter) model is used to calculate the motion vector of each sub-block inside a coding block with the signaled control points motion information. For the coding units where syntax element merge_flag equal to 0, the syntax element inter_affine_flag is signaled to indicate the current coding unit whether uses the affine inter prediction or not.

Further, in some related examples, the size of regular merge candidate list and the size of sub-block based merge candidate list are signaled separately.

Figure 8:
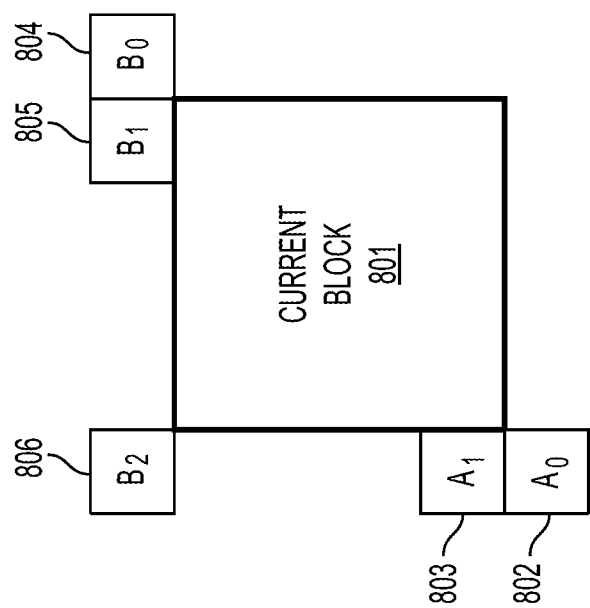
FIG. 8 shows examples of spatial merge candidates.

FIG. 8 shows examples of spatial merge candidates. Referring to FIG. 8, a current block (801) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (802 through 806, respectively). In some examples, the MV prediction can use predictors from the same reference picture that the neighboring block is using.

In some embodiments, a merge mode for inter-picture prediction is used. In an example, when a merge flag (including skip flag) is signaled as true, a merge index is then signaled to indicate which candidate in a merge candidate list is used to indicate the motion vectors of the current block. At decoder, a merge candidate list is constructed based on spatial and temporal neighbors of the current block. In some examples, up to four spatially neighboring MVs are added into merge candidate lists. In addition, up to one MV from temporal neighbors on the current block is added to the merge candidate list.

In some examples, additional merge candidates include combined bi-predictive candidates and zero motion vector candidates. In an example, before taking the motion information of a block as a merge candidate, the redundancy checks are performed to check whether the motion information is identical to an element in the current merge candidate list. When the motion information is different from each element in the current merge candidate list, the motion information can be added to the merge candidate list as a merge candidate. MaxMergeCandsNum is defined as the size of merge list in terms of candidate number. In an example, such as HEVC, MaxMergeCandsNum is signaled in bitstream. In an example, the maximum allowed size of the regular merge list is 6 in VVC Test Model 3 (VTM3).

Affine merge (AF_MERGE) mode is another tool that can be used. AF_MERGE mode can be applied for CUs with both width and height larger than or equal to 8. In the AF_MERGE mode, the control point motion vectors (CP-MVs) of the current CU are generated based on the motion information of the spatial neighboring CUs. In some examples, the number of control point motion vector predictor (CPMVP) candidates can be up to five and an index is signalled to indicate the of the CPMVP candidates to be used for the current CU. In some embodiments, three types of CPMVP candidates are used to form the affine merge candidate list. The first type of CPMVP candidates can be inherited affine merge candidates that are extrapolated from the CPMVs of the neighbour CUs. The second type of CPMVP candidates can be constructed affine merge candidates CPMVPs that are derived using the translational MVs of the neighbour CUs. The third type of CPMVP candidates are zero MVs.

In some standards, such as VVC Test Model 3 (VTM3), there are maximum two inherited affine candidates, which are derived from affine motion model of the neighboring blocks, one from left neighboring CUs and one from above neighboring CUs. The candidate blocks can the blocks A0, A1, B0, B1 and B2 shown in FIG. 8. For the left predictor, the scan order is A0→A1, and for the above predictor, the scan order is B0→B1→B2. In an example, the first inherited candidate from each side is selected. No pruning check is performed between two inherited candidates. When a neighboring affine CU is identified, its control point motion vectors are used to derive the CPMVP candidate in the affine merge list of the current CU.

Figure 9:
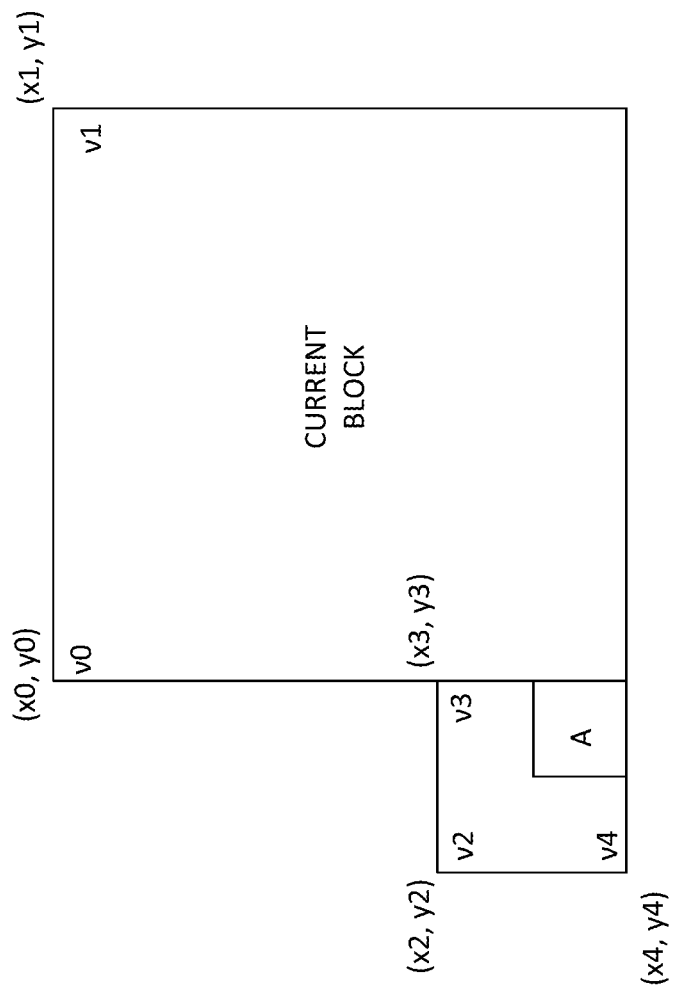
FIG. 9 shows an example for affine merge mode.

FIG. 9 shows an example for affine merge mode. As shown in FIG. 9, when the neighbour left bottom block A is coded in affine mode, the motion vectors $v_2$, $v_3$ and $v_4$ of the top left corner, above right corner and left bottom corner of a CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 10:
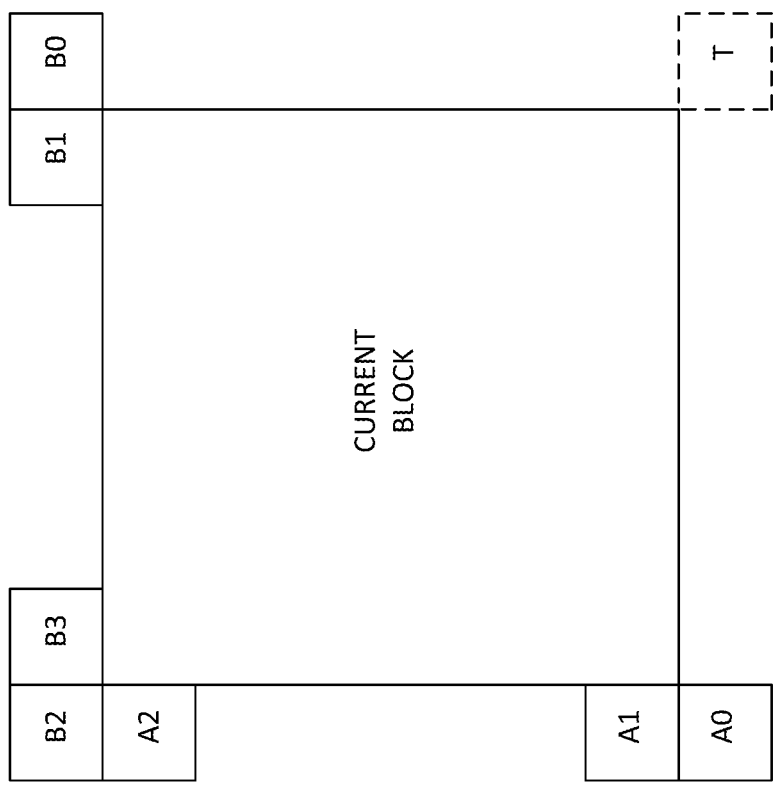
FIG. 10 shows examples of deriving motion information for the control points from the spatial neighbors and temporal neighbor.

In an example, constructed affine candidate is a candidate that is constructed by combining the neighbor translational motion information of each control point. The motion information for the control points is derived from the specified spatial neighbors and temporal neighbor shown in FIG. 10. $CPMV_k$ (k=1, 2, 3, 4) can be used to represent the k-th control point. For $CPMV_1$, in an example, neighboring blocks B2, B3 and A2 are checked in an order of B2→B3→A2 and the MV of the first available block is used. For $CPMV_2$, in an example, neighboring blocks B1 and B0 are checked in an order of B1→B0 blocks, and the MV of the first available block is used. For $CPMV_3$, in an example, neighboring blocks A1 and A0 are checked in an order of A1→A0, and the MV of the first available block is used. In an example, TMVP is used as $CPMV_4$ when temporal motion vector prediction (shown as T in FIG. 10) is available.

In some examples, after the motion information (motion vectors) of four control points are attained, affine merge candidates are constructed based on the motion information. In an example, the motion information of the control points is suitably combined and used in an order to construct affine merge candidates. For example, the order is {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}. The combination of 3 CPMVs constructs a 6-parameter affine merge candidate and the combination of 2 CPMVs constructs a 4-parameter affine merge candidate. To avoid motion scaling process, when the reference indices of control points are different, the related combination of control point MVs is discarded.

The subblock-based temporal motion vector prediction (SbTMVP) is supported in some standards, such as VTM. Similar to the temporal motion vector prediction (TMVP) in HEVC, SbTMVP uses the motion field in the collocated picture to improve motion vector prediction and merge mode for CUs in the current picture. In some examples, the same collocated picture used by TMVP is used for SbTVMP.

SbTMVP differs from TMVP in two main aspects. In the first main aspect, TMVP predicts motion information at CU level while SbTMVP predicts motion information at sub-CU level. In the second main aspect, the TMVP fetches the temporal motion vectors from the collocated block in the collocated picture (the collocated block is the bottom-right or center block relative to the current CU), while SbTMVP applies a motion shift before fetching the temporal motion information from the collocated picture, and the motion shift is obtained from the motion vector from one of the spatial neighboring blocks of the current CU.

Figure 11:
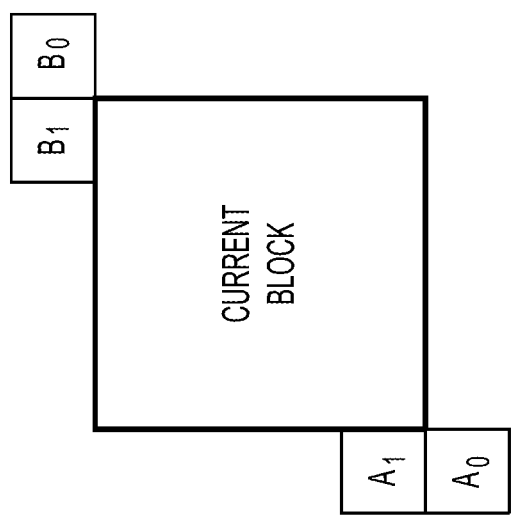
FIGS. 11-12 show an example of a prediction process according to some embodiments of the disclosure.
Figure 12:
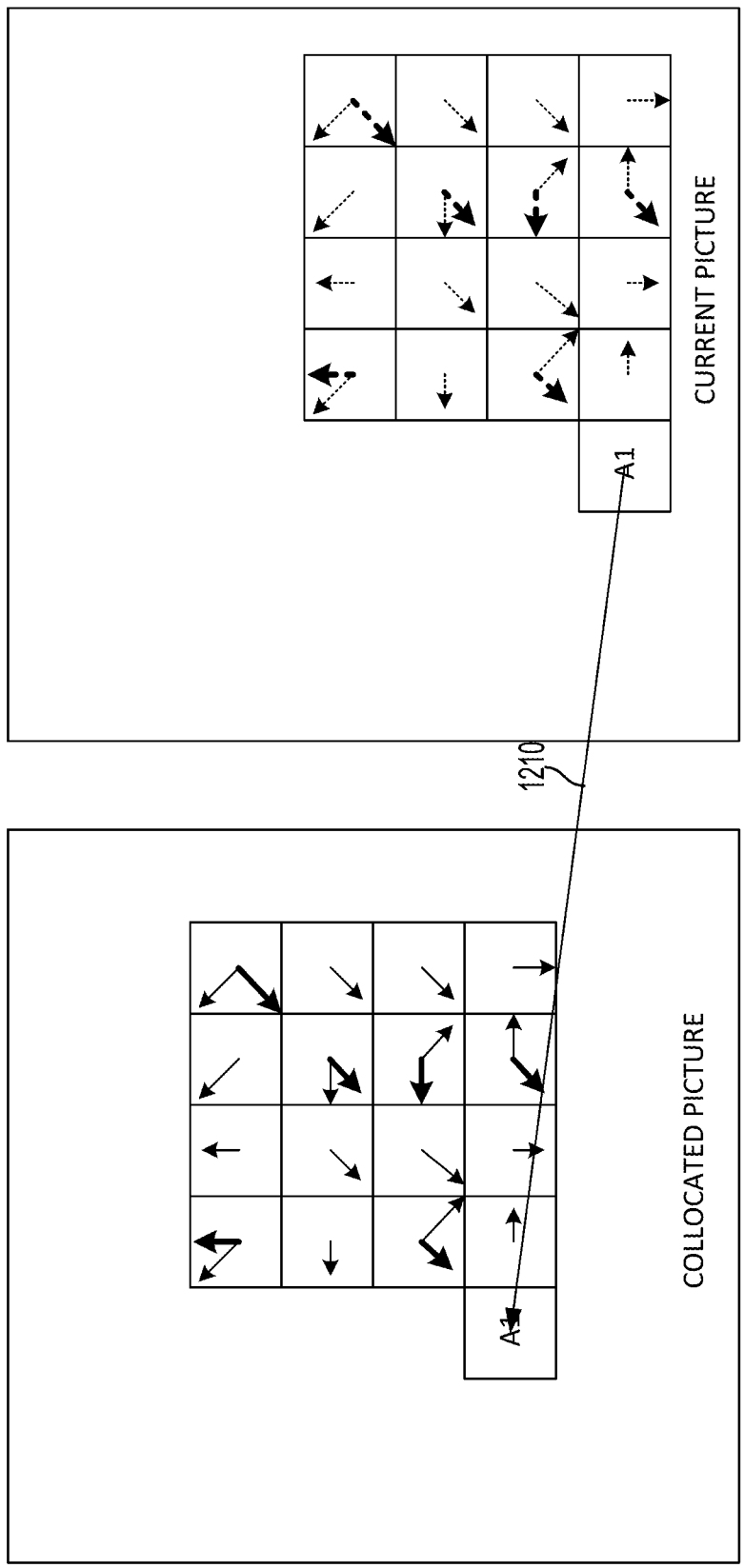

FIGS. 11-12 show an example of a SbTVMP process according to some embodiments of the disclosure. SbTMVP predicts the motion vectors of the sub-CUs within the current CU in two steps. In the first step, the spatial neighbors shown in FIG. 11 are examined in the order of A1, B1, B0 and A0 to identify a first spatial neighboring block that has a motion vector using the collocated picture as its reference picture. Then, the motion vector using the collected picture as its reference picture is selected to be the motion shift to be applied. If no such motion is identified from the spatial neighbors of A1, B1, B0 and A0, then the motion shift is set to (0, 0).

In the second step, the motion shift identified in the first step is applied (i.e. added to the current block's coordinates) to obtain sub-CU-level motion information (motion vectors and reference indices) from the collocated picture as shown in FIG. 12. In the FIG. 12 example, A1's motion vector is set as the motion shift 1210. Then, for each sub-CU, the motion information of the corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC. For example, temporal motion scaling is applied to align the reference pictures of the temporal motion vectors to those of the current CU.

In some examples, such as in VTM3, a combined sub-block based merge list which includes both SbTVMP candidate and affine merge candidates is used for the signalling of sub-block based merge mode. The SbTVMP mode is enabled/disabled by a sequence parameter set (SPS) flag. When the SbTMVP mode is enabled, the SbTMVP predictor is added as the first entry of the combined sub-block based merge list, and followed by the affine merge candidates. The maximum allowed size of the sub-block based merge list is 5 in VTM3.

In an example, the sub-CU size used in SbTMVP is fixed to be 8×8, and as done for affine merge mode, SbTMVP mode is only applicable to the CU with both width and height are larger than or equal to 8.

In some embodiments, the encoding logic of the additional SbTMVP merge candidate is the same as for the other merge candidates. In an example, for each CU in P or B slice, an additional rate distortion check is performed to decide whether to use the SbTMVP candidate.

According to some aspects of the disclosure, various improvements can be applied to improve the coding efficiency. In an example, constrains can be applied to limit usage of the triangular prediction unit mode to coding blocks, whose width or height is 4. It is noted that the area of the coding blocks may already satisfy the area requirement (area>=64).

In some embodiments, the coding coder of flags, such as umve_flag, sub_block_flag, MHIntra_flag, triangle_flag and the like matches the usage frequency of the corresponding modes. For example, the flag of the most frequently used mode is firstly coded, while the flag of the least frequently used mode is coded at last. In an example, the flag of the most frequently used mode can be decoded quickly without decoding the less frequently used mode. In some example, the decoder uses a sequence of "if" comments to determine a prediction mode based on the flags. When the decoder decodes the first "true" flag, the rest of the "if" comments can be skipped. Then, when the most frequently used mode is firstly coded, the average time for the decoder to determine the prediction mode can be reduced.

For coding unit coded with merge/skip mode, the sub_block_flag indicates the affine prediction or ATMVP is used or not, while the inter_affine_flag only indicates affine is used or not for inter predicted coding unit. In some related examples, the same context models and the same context model derivation are used for syntax elements sub_block_flag and inter_affine_flag, and may cause low efficiency in the context models. The present disclosure provides techniques for using different context model derivations for syntax elements sub_block_flag and inter_affine_flag.

It is noted that the proposed methods may be used separately or combined in any order. In the following description, the term block may be interpreted as a prediction block, a coding block, or a coding unit, i.e. CU; the term width and height denote the width and height of a block.

According to some aspects of the disclosure, further constrains on the usage of triangular prediction unit mode are applied. The constrains are based on block shape or size information. In some embodiments, the triangular prediction unit mode is not allowed for narrow blocks. In an embodiment, some threshold values are used. For example, M is the width threshold and N is the height threshold. Then, when width<=M or height<=N, the triangular prediction unit mode is not allowed.

It is noted that the thresholds can be any suitable values. In an example, M and N are set to 4. In another example, M and N are set to 8.

It is also noted that M and N may be same or different. In some embodiments, M and N are signaled in bitstream, such as in sequence parameter set (SPS), picture parameter set (PPS), or slice header.

In some embodiments, M and N can be derived based on coded information, including but not limited to temporal layer, quantization parameter (QP) and picture resolution. The coded information may also include the usage of triangular prediction unit (PU) of a previously coded frame. In an example, when the percentage of triangular PU with width larger than M' is smaller than a given threshold, then M is updated to be M'. In another example, when the percentage of all triangular PU with width large than M' is larger than a given threshold, then M is updated to be M'<<1.

In some embodiments, when the triangle prediction unit is not allowed, the flag triangle_flag is not signaled, but inferred to be zero (not used). In another embodiment, when the triangle prediction unit is not allowed, the flag triangle_flag is signaled, but always assigned to be zero (not used).

According to some aspects of the disclosure, the coding order of some merge flags, such as umve_flag, sub_block_flag, MHIntra_flag, triangle_flag and the like are set according to their usage frequency. The usage of a flag refers to the usage of the mode corresponding to the flag. In an embodiment, the most frequently used flag is firstly coded, while the least frequently used flag is coded at last.

In another embodiment, the merge flags are ordered according to different priority groups. For example, umve_flag and sub_block_flag have higher priority than MHIntra_flag and triangle_flag. The flags of umve_flag and sub_block_flag are in a higher priority group, the flags of MHIntra_flag and triangle_flag are in a lower priority group. The flags in the high priority group are signaled before the flags of the low priority group. The order within one priority group may be determined by other rules. Accordingly, in some examples, only when the flags in higher priority level group(s) are all signaled or inferred as false, the flags in lower priority group(s) are needed to be signaled. Otherwise, if any of the flags in a higher priority group is true, all the flags in the lower priority group(s) should be either signaled to be false or inferred to be false.

In another embodiment, the coding order of these flags for merge related modes, such as umve_flag, sub_block_flag, MHIntra_flag, triangle_flag and the like may be signaled in a higher level syntax structure in bitstream, such as in SPS, PPS, or slice header, or tile group header, or tile header, or any header that is associated with a picture or a fraction of a picture. Thus, different pictures, slices or tile groups may use different coding orders. The coding orders may be determined based on attributes of the pictures, slices or tile groups.

It is noted that any suitable coding order can be used. In some examples, the coding order of these flags is umve_flag, sub_block_flag, triangle_flag and MHIntra_flag. In an example, MHIntra_flag is not signaled and is inferred to be false when any flag among umve_flag, sub_block_flag, and triangle_flag is true. In another embodiment, the coding order is sub_block_flag, umve_flag, triang_flag, and MHIntra_flag.

In some embodiments, the coding order of the merge related flags, such as sub_block_flag, umve_flag, triang_flag, and MHIntra_flag, are adaptively adjusted during the coding/decoding. In some examples, when there are more than N neighboring blocks (e.g., N is a pre-defined integer threshold) coded by a particular coding mode, the order of the corresponding flag for this particular coding mode and the coding mode flag signaled ahead of this particular coding mode is swapped.

In another example, some counters are used to count the number of blocks (or samples) that are coded by each of these modes. After the decoding of the current block (or current VPDU, or current CTU), the coding order of these flags are adjusted based on the counted numbers by the counters.

In another embodiment, a new syntax element, e.g., mode_idc, is signaled to identify which mode (sub_block, umve, triangle, MHIntra) is used. The mode_idc may be binarized with truncated unary coding. The mapping between mode_idc and the final modes may be predefined, or signaled in the bitsteam at a higher level syntax structure, or adaptively adjusted.

In another embodiment, the value of the previously coded merge mode related flags can be used as the context value for coding the current coding mode flag to be signaled. The coded flags and current flag include sub_block_flag, umve_flag, triang_flag, and MHIntra_flag, and the coded flags need to be coded before the current flag.

According to another aspect of the disclosure, the top-left and/or top-right neighboring coding blocks can be used in the context model selection of triangle_flag.

In an embodiment, the triangle_flags from the top-left and top-right neighboring coding blocks are used to select the context model. In an example, when both triangle_flags from the top-left and top-right neighboring coding blocks are equal to false, the context model with index 0 is used; when both triangle_flags from the top-left and top-right neighboring coding blocks are equal to true, the context model with index 2 is used; otherwise, the context model with index 1 is used.

In another example, when both triangle_flags from the top-left and top-right neighboring coding blocks are equal to false, the context model with index 0 is used; otherwise, the context model with index 1 is used.

In another embodiment, the triangle_flags from the left and above neighboring coding blocks are used to select the context model. When both triangle_flags from the left and above neighboring coding blocks are equal to false, the context model with index 0 is used; otherwise, the context model with index 1 is used.

In another embodiment, the triangle_flag from the top-left neighboring coding block is used to select the context model. In an example, when triangle_flag from the top-left neighboring coding block is equal to false, the context model with index 0 is used; otherwise, the context model with index 1 is used.

In another embodiment, the triangle_flag from the top-right neighboring coding block is used to select the context model. In an example, when triangle_flag from the top-right neighboring coding block is equal to false, the context model with index 0 is used; otherwise, the context model with index 1 is used.

According to another aspect of the disclosure, an intra prediction mode is assigned for a coding block coded by triangle partition, and the intra prediction mode is identified by the triangle partition mode and/or the block shape, and this assigned intra prediction mode can be used for intra mode coding and deriving the most probable mode of the subsequent coding blocks which are coded in intra prediction mode.

In some examples, such as in VVC, a total of 87 intra prediction modes can be used.

Figure 13:
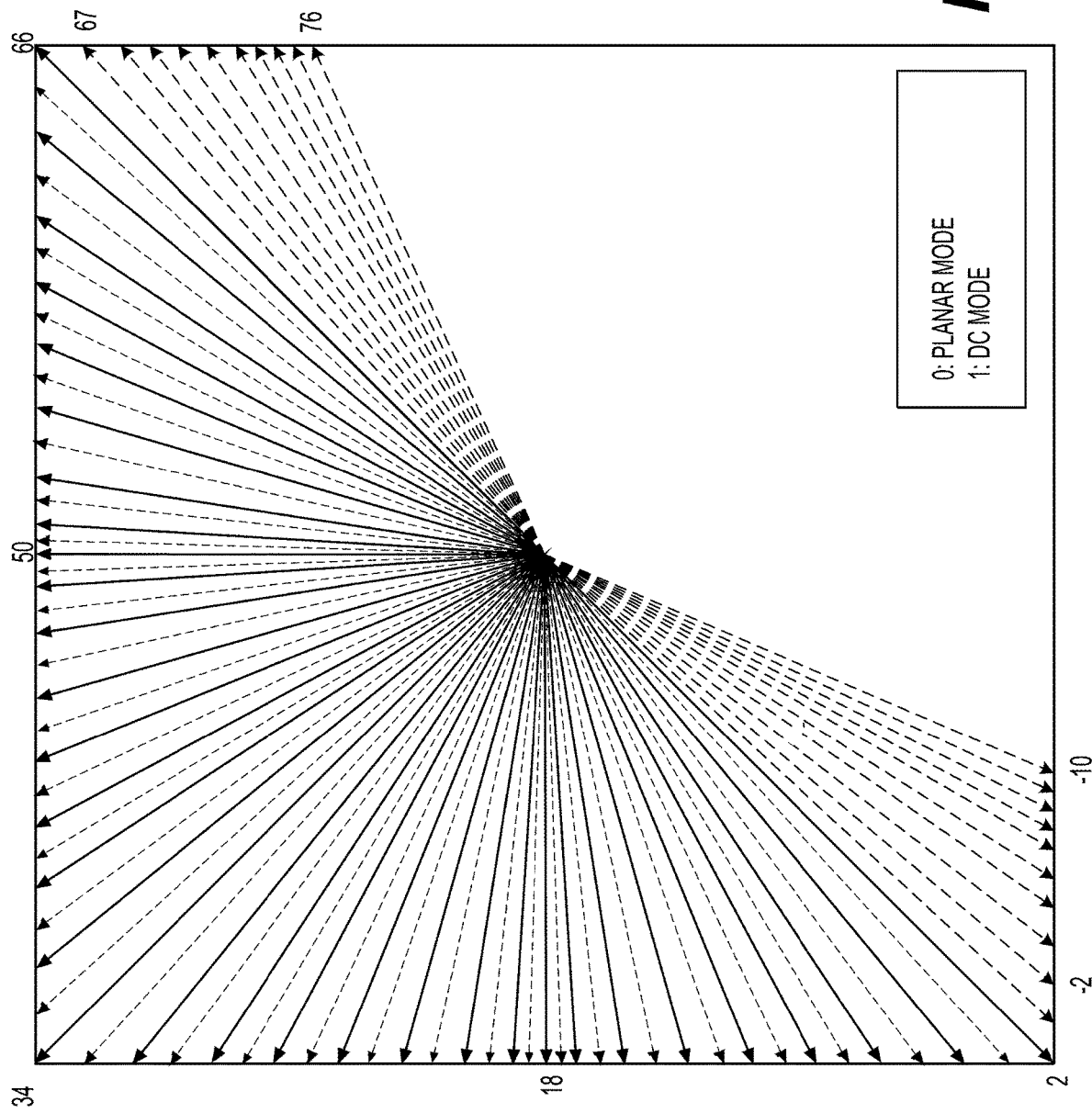
FIG. 13 shows an example of intra prediction modes according to some embodiments of the disclosure.

FIG. 13 shows an example of intra prediction modes according to some embodiments of the disclosure. In some examples, 65 directional intra prediction modes that are numbered from intra prediction mode 2 to intra prediction mode 66 are used. Intra prediction mode 0 is a planar mode, and intra prediction mode 1 is DC mode. Further, in some example, wide angle intra prediction modes (WAIP) are added. In the FIG. 13 example, intra prediction mode−1 to intra prediction mode−10, and intra prediction mode 67 to intra prediction mode 76 are added. As shown in FIG. 13, the intra prediction mode 18 is a horizontal mode, the intra prediction mode 50 is a vertical mode, and the intra prediction mode 2, the intra prediction mode 34 and the intra prediction mode 66 are diagonal modes.

In an embodiment, the block shape is identified by the width to height ratio of the block, or block area size, or block width, or block height. In one embodiment, after triangle partitioning, if the two PUs are located at the bottom-left and top-right positions of the current block, the intra prediction mode which has a prediction direction closest to the angle connecting the top-left sample and bottom-right sample is assigned to the current coding block. In an example, when the current block is square, and the two PUs are located at the bottom-left and top-right positions of the current block, then intra prediction mode 34 (one of the diagonal modes shown in FIG. 13) is assign to the current block.

In another embodiment, after triangle partitioning, when the two PUs are located at the bottom-right and top-left positions of the current block, the intra prediction mode which has a prediction direction closest to the angle connecting the top-left sample and bottom-right sample is assigned to the current coding block. In an example, when the current block is square, and the two PUs are located at the bottom-left and top-right positions of the current block, then intra prediction mode 66 (one of the diagonal modes shown in FIG. 13) is assign to the current block. In another example, when the current block is square, and the two PUs are located at the bottom-left and top-right positions of the current block, then intra prediction mode 2 (one of the diagonal modes shown in FIG. 13) is assign to the current block.

According to another aspect of the disclosure, different context model derivation methods are used for syntax elements sub_block_flag and inter_affine_flag. In an embodiment, the sub_block flags from the left and above neighboring coding blocks are used to derive the context model of sub_block_flag. For example, when both sub_block flags from the left and above neighboring coding blocks are equal to false, the context model with index 0 is used; when both sub_block flags from the left and above neighboring coding blocks are equal to true, the context model with index 2 is used; otherwise, the context model with index 1 is used.

In another embodiment, the inter_affine_flags from the left and above neighboring coding blocks are used to derive the context model of inter_affine_flag. For example, when both inter_affine_flags from the left and above neighboring coding blocks are equal to false, the context model with index 0 is used; when both inter_affine_flags from the left and above neighboring coding blocks are equal to true, the context model with index 2 is used; otherwise, the context model with index 1 is used.

Further, in another embodiment, sub_block_flag and inter_affine_flag use different context model sets. For example, although the calculated context model indices for sub_block_flag and inter_affine_flag are the same, different context models are still used for sub_block_flag and inter_affine_flag because the different context model sets are used.

According to some other aspects of the disclosure, the size of the regular merge candidate list (block based) and the size of the sub-block based merge candidate list are signaled in a related manner instead of in a separate manner to improve signaling efficiency. The signaling techniques can be applied to skip mode as well.

In the following description, the term block may be interpreted as a prediction block, a coding block, or a coding unit, i.e. CU.

According to an aspect of the disclosure, a unified merge list size signaling technique is used. In some embodiments, the unified merge list size is used for both regular merge mode and sub-block based merge mode. In some embodiments, the sub-block merge list size is not signaled, but can be derived from the size of regular merge list. In a related example, the size of the regular merge candidate list and the size of the sub-block based merge candidate list are signaled separately. Compared with the related example, the techniques disclosed in the present disclosure have higher coding efficiency.

In an embodiment, the variable "max_allowed_merge_size−actual_merge_size" (a difference of the maximum allowed merge list size and the actual merge list size) is signaled at slice header, tile/tile group header, or any other applicable headers, for both merge mode lists. In the embodiment, max_allowed_merge_size represents the maximum allowed merge list size, and actual_merge_size represents the actual used merge size in the current tile/tile group/slice/picture/sequence, or any other applicable header.

In another embodiment, the maximum allowed merge size for both lists are set to be 6 or 5 as a predefined value for both encoder and decoder.

In another embodiment, the binarization context modeling and entropy coding of the merge index for both lists are the same.

In another embodiment, when affine mode or SbTMVP mode is not enabled for the current tile/tile group/slice/picture/sequence, or any other level beyond the current block, the decoded merge list size for sub-block merge mode is clipped to be a smaller size. The merge size for regular merge list is unchanged (the decoded value).

In another embodiment, when affine mode is not enabled, the sub-block merge mode candidate list size is decided by the smaller of the following two: the decoded merge list size for both lists and the use flag value indicating whether SbTMVP merge mode is used (being 1) or not (being 0).

In another embodiment, when SbTMVP merge mode is not enabled, the sub-block merge mode candidate list size is decided by the smaller of the following two: the decoded merge list size for both lists and N times of the use flag value indicating whether affine merge mode is used (being 1) or not (being 0), where N is an integer value for affine merge list size. In an example, N can be set as 5. Thus, depending on the affine use flag, the sub-block merge list size can be either N or 0.

In another embodiment, when SbTMVP merge mode is not enabled, the sub-block merge mode candidate list size is still decided by the decoded merge list size. In this case, the absence of SbTMVP mode does not affect the actual used merge list size for both lists.

Figure 14:
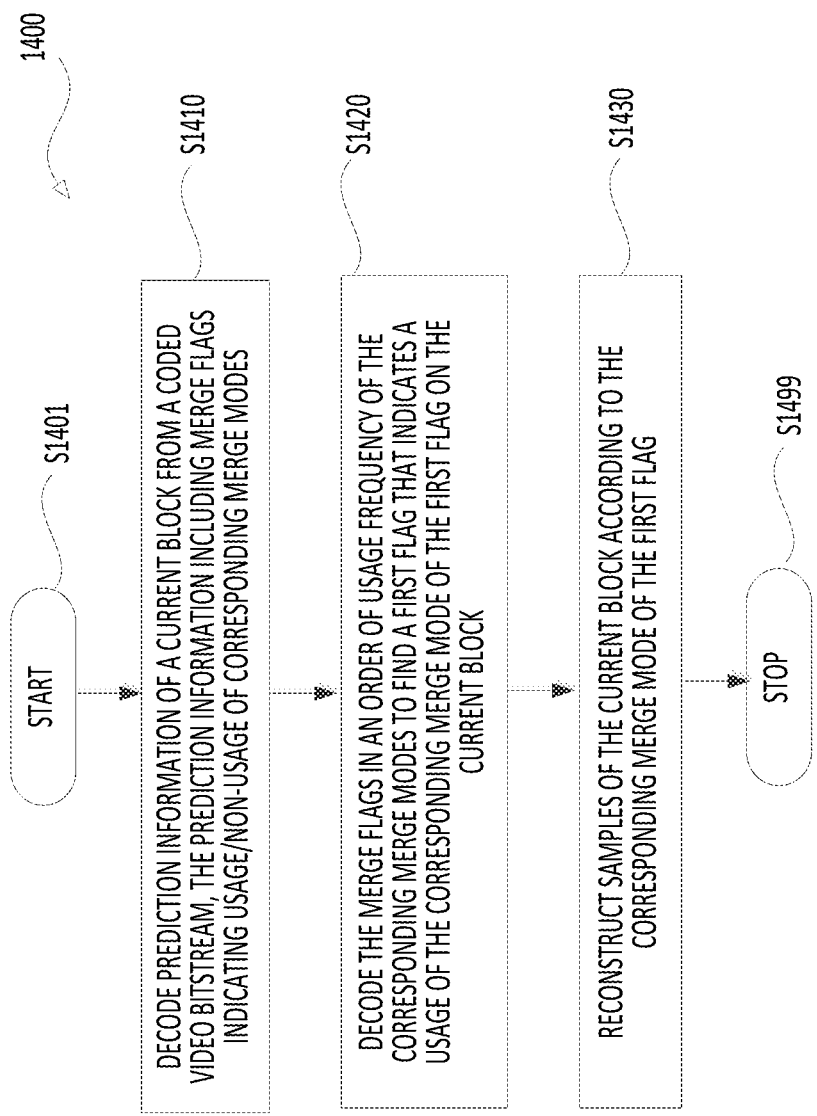
FIG. 14 shows a flow chart outlining a process example according to some embodiments of the disclosure.

FIG. 14 shows a flow chart outlining a process (1400) according to an embodiment of the disclosure. The process (1400) can be used in the reconstruction of a block coded in intra mode, so to generate a prediction block for the block under reconstruction. In various embodiments, the process (1400) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1400) is implemented in software instructions, thus when the processing circuitry executes the software instructions, the processing circuitry performs the process (1400). The process starts at (S1401) and proceeds to (S1410).

At (S1410), prediction information of a current block is decoded from a coded video bitstream. The prediction information includes merge flags that indicates usage or non-usage of corresponding merge modes of the merge flags on the current block. In an example, the merge flags include a flag corresponding to a merge with motion vector difference mode, a flag corresponding to a sub-block merge prediction mode, a flag corresponding to a multi-hypothesis prediction for intra mode and a flag corresponding to a triangular prediction unit mode.

At (S1420), the merge flags are decoded in an order of usage frequencies of the corresponding merge modes to find a first flag that indicates a usage of the corresponding merge mode to the first flag on the current block. In an example, the merge flags are decoded in a usage frequency reducing order of the corresponding merge modes. The merge flag corresponding to the most frequently used merge mode is firstly decoded, while the merge flag corresponding to the least frequently used merge mode is decoded last. In some embodiments, a coding order signal is decoded from the coded video bitstream. The coding order signal is indicative of the order for decoding the merge flags. Then, the merge flags are decoded according to the order that is indicated by the coding order signal. The coding order signal can be signaled in a higher level syntax structure in the coded video bistream, such as from any of a sequence parameter set (SPS), a picture parameter set (PPS), a slice header, a tile group header, and a tile header.

At (S1430) samples of the current block are reconstructed based on the corresponding merge mode of the first flag. Then, the process proceeds to (S1499) and terminates.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
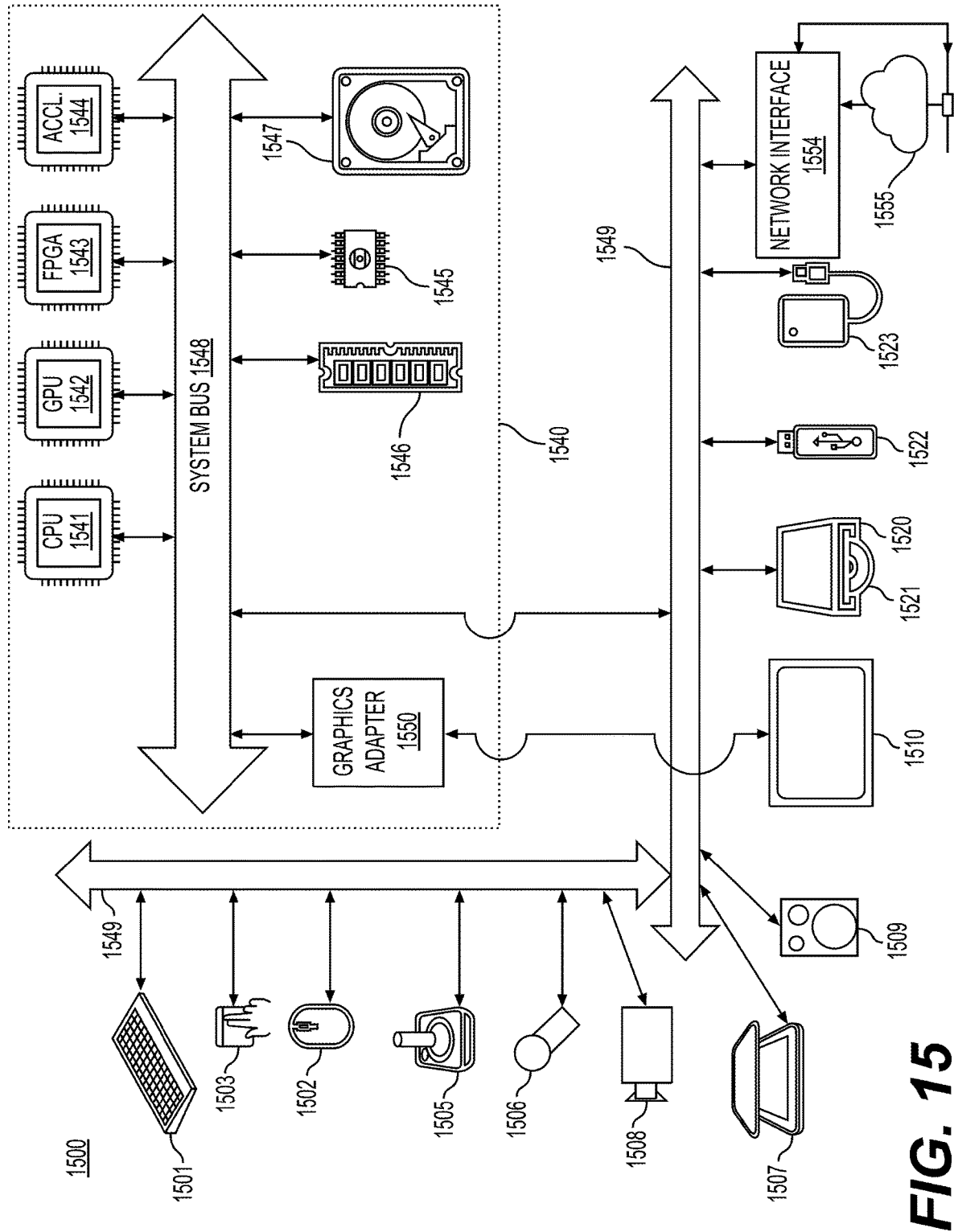
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding in a decoder, comprising:
decoding prediction information of a current block from a coded video bitstream, the prediction information including merge flags that respectively indicate usage/non-usage of corresponding merge modes;
decoding the merge flags in an order of usage frequencies of the corresponding merge modes to find a first flag that indicates a usage of the corresponding merge mode of the first flag on the current block; and
reconstructing samples of the current block according to the corresponding merge mode of the first flag.

2. The method of claim 1, wherein the merge flags include at least one of a flag corresponding to a merge with motion vector difference mode, a flag corresponding to a sub-block merge prediction mode, a flag corresponding to a multi-hypothesis prediction for intra mode and a flag corresponding to a triangular prediction unit mode.

3. The method of claim 1, further comprising:
decoding the merge flags in a usage frequency reducing order of the corresponding merge modes.

4. The method of claim 1, further comprising:
decoding a coding order signal from the coded video bitstream, the coding order signal being indicative of the order for decoding the merge flags; and
decoding the merge flags according to the order that is indicated by the coding order signal.

5. The method of claim 4, further comprising:
decoding the coding order signal from at least one of a sequence parameter set (SPS), a picture parameter set (PPS), a slice header, a tile group header, and a tile header.

6. The method of claim 1, further comprising:
when at least one of a width and a height is smaller than a threshold,
setting a flag corresponding to a triangular prediction unit mode to a default value that disables a usage of the triangular prediction unit mode.

7. The method of claim 1, further comprising:
decoding a mode index from the coded video bitstream; and
selecting a merge mode from one of a merge with motion vector difference mode, a sub-block merge prediction mode, a multi-hypothesis prediction for intra mode and a triangular prediction unit mode based on the mode index.

8. The method of claim 1, further comprising:
decoding a flag corresponding to a sub-block merge prediction mode using a first set of context models that is different from a second set of context models that is used for deriving a flag for an affine inter prediction mode.

9. The method of claim 1, further comprising:
decoding a size signal that is indicative of a size of a merge candidate list; and
determining a size of a sub-block based merge candidate list based on the size signal.

10. The method of claim 9, further comprising:
when one of an affine mode and a sub-block based temporal motion vector prediction (SbTMV) is disabled,
reducing the size of the sub-block based merge candidate list without changing the size of the merge candidate list.

11. An apparatus of video decoding, comprising:
processing circuitry configured to:
decode prediction information of a current block from a coded video bitstream, the prediction information including merge flags that respectively indicate usage/non-usage of corresponding merge modes;
decode the merge flags in an order of usage frequencies of the corresponding merge modes to find a first flag that indicates a usage of the corresponding merge mode of the first flag on the current block; and
reconstruct samples of the current block according to the corresponding merge mode of the first flag.

12. The apparatus of claim 11, wherein the merge flags include at least one of a flag corresponding to a merge with motion vector difference mode, a flag corresponding to a sub-block merge prediction mode, a flag corresponding to a multi-hypothesis prediction for intra mode and a flag corresponding to a triangular prediction unit mode.

13. The apparatus of claim 11, wherein the processing circuitry is further configured to:
decode the merge flags in a usage frequency reducing order of the corresponding merge modes.

14. The apparatus of claim 11, wherein the processing circuitry is further configured to:
decode a coding order signal from the coded video bitstream, the coding order signal being indicative of the order for decoding the merge flags; and
decode the merge flags according to the order that is indicated by the coding order signal.

15. The apparatus of claim 14, wherein the processing circuitry is further configured to:
decode the coding order signal from at least one of a sequence parameter set (SPS), a picture parameter set (PPS), a slice header, a tile group header, and a tile header.

16. The apparatus of claim 11, wherein the processing circuitry is further configured to:
when at least one of a width and a height is smaller than a threshold,
set a flag corresponding to a triangular prediction unit mode to a default value that disables a usage of the triangular prediction unit mode.

17. The apparatus of claim 11, wherein the processing circuitry is further configured to:
decode a mode index from the coded video bitstream; and
select a merge mode from one of a merge with motion vector difference mode, a sub-block merge prediction mode, a multi-hypothesis prediction for intra mode and a triangular prediction unit mode based on the mode index.

18. The apparatus of claim 11, wherein the processing circuitry is further configured to:
decode a flag corresponding to a sub-block merge prediction mode using a first set of context models that is different from a second set of context models that is used for deriving a flag for an affine inter prediction mode.

19. The apparatus of claim 11, wherein the processing circuitry is further configured to:
   decode a size signal that is indicative of a size of a merge candidate list; and
   determine a size of a sub-block based merge candidate list based on the size signal.

20. The apparatus of claim 19, wherein the processing circuitry is further configured to:
   when one of an affine mode and a sub-block based temporal motion vector prediction (SbTMV) is disabled,
   reduce the size of the sub-block based merge candidate list without changing the size of the merge candidate list.

* * * * *